(12) United States Patent
Kuo

(10) Patent No.: US 8,161,962 B2
(45) Date of Patent: Apr. 24, 2012

(54) SUN TRACKING SYSTEM

(76) Inventor: Yi-Tieng Kuo, Taoyuan County (TW)

( * ) Notice: Subject to any disclaimer, the term of this patent is extended or adjusted under 35 U.S.C. 154(b) by 222 days.

(21) Appl. No.: 12/761,398

(22) Filed: Apr. 16, 2010

(65) Prior Publication Data

US 2011/0253125 A1     Oct. 20, 2011

(51) Int. Cl.
*F24J 2/38* (2006.01)

(52) U.S. Cl. ........ 126/600; 126/571; 126/576; 126/601; 126/602; 126/603; 126/604; 126/605; 126/606; 126/607; 126/608

(58) Field of Classification Search .......... 126/600–608, 126/571, 576
See application file for complete search history.

(56) References Cited

U.S. PATENT DOCUMENTS

| 4,360,182 | A | * | 11/1982 | Titus | 248/371 |
| 6,099,217 | A | * | 8/2000 | Wiegand et al. | 409/201 |
| 2005/0034751 | A1 | * | 2/2005 | Gross et al. | 136/246 |

* cited by examiner

*Primary Examiner* — Kenneth Rinehart
*Assistant Examiner* — Jorge Pereiro

(57) ABSTRACT

A sun tracking system includes a reduction device of a servo motor, multiple shafts, multiple couplers, and at least two rows of cylinders and each row having at least two cylinders, a solar panel, multiple pivotal connection units and multiple sliding units. The reduction device of a servo motor drives the cylinders of the first and second rows of cylinders which drive other cylinders. The cylinders of the first row of cylinders are pivotably connected to the solar panel and the cylinders of the second row of cylinders are movably connected to the solar panel. By the cylinders of the same row moving upward or downward while the cylinders of the other row moving downward or upward, the panel is controlled to aim the sun.

4 Claims, 7 Drawing Sheets

SUN TRACKING SYSTEM

FIELD OF THE INVENTION

The present invention relates to a tracking system, and more particularly, to a solar tracking system which includes multiple shafts to rotate the solar panel precisely to aim the sun.

BACKGROUND OF THE INVENTION

A conventional solar generating system generally includes a solar panel which is supported by multiple shafts, but the multiple shafts cannot move synchronously. The conventional support shafts cannot move the solar panel to aim the sun so that the solar panel cannot absorb sufficient solar energy along with the movement of the sun. Some conventional solar generating systems are equipped with multiple shafts which are moved individually, but there lacks a management unit to manage the movements of the shafts so that the shafts are moved asynchronously and the solar panel and the shafts are damaged within a short period of time. Therefore, most of the conventional solar generating systems use stationary shafts which reduce the operation efficiency of the solar panel.

The present invention intends to provide a tracking system that allows the multiple shafts to move synchronously so as to track the sun to have the best result for absorbing the solar energy and would not damage the tracking system.

SUMMARY OF THE INVENTION

The present invention relates to a sun tracking system which comprises a reduction device of a servo motor, multiple shafts, multiple couplers, and at least two rows of cylinders and each row having at least two cylinders, a solar panel, multiple pivotal connection units and multiple sliding units. The reduction device of a servo motor drives the cylinders of the first and second rows of cylinders which drive other cylinders. The cylinders of the first row of cylinders are pivotably connected to the solar panel and the cylinders of the second row of cylinders are movably connected to the solar panel. By the cylinders of the same row moving upward or downward while the cylinders of the other row moving downward or upward, the panel is controlled to aim the sun.

The conventional support system of the solar panel, which includes multiple fixed shafts and the solar panel cannot be aimed the sun along with the movement of the sun or includes multiple movable shafts but the movable shafts move asynchronously, the tracking system of the present invention use multiple rows of cylinders which are moved such that the solar panel can track the sun all the way with the movement of the sun.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
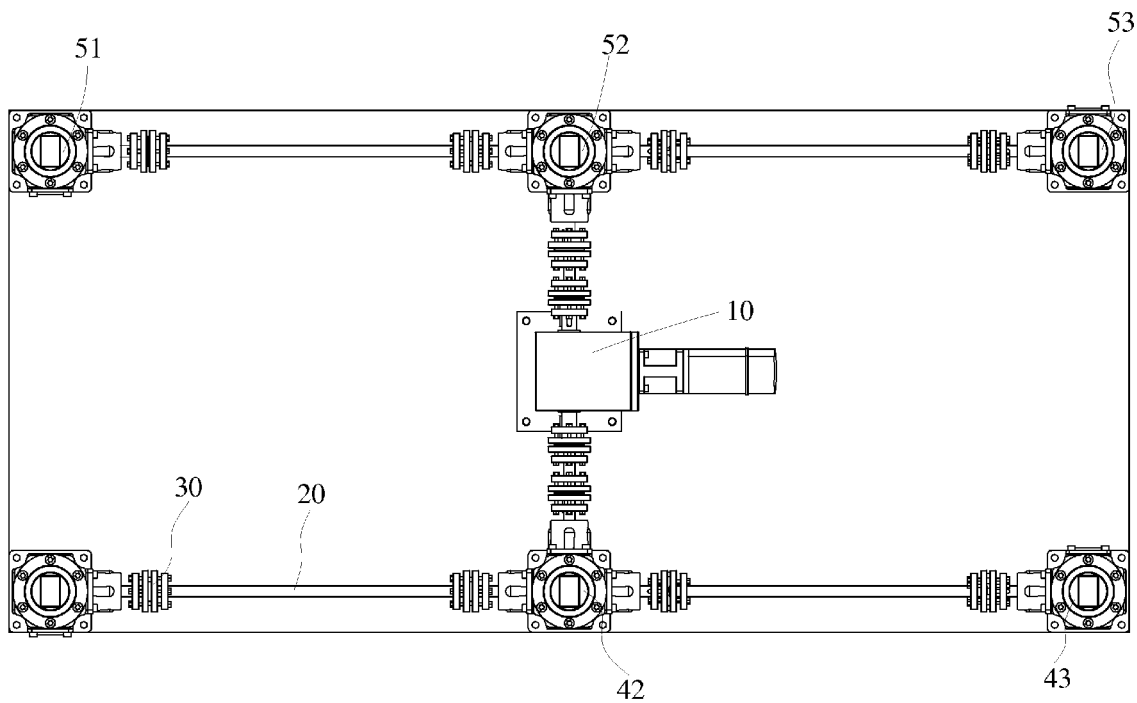
FIG. 1 shows the arrangement of the sun tracking system of the present invention.
Figure 2:
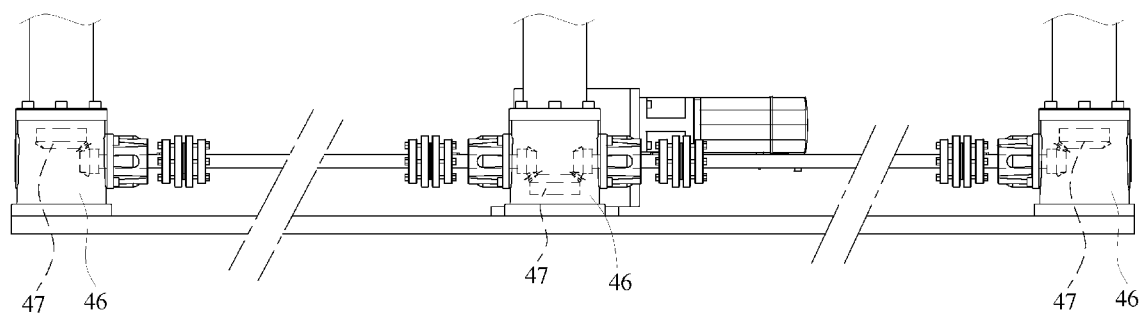
FIG. 2 shows the a portion of the sun tracking system of the present invention.
Figure 3:
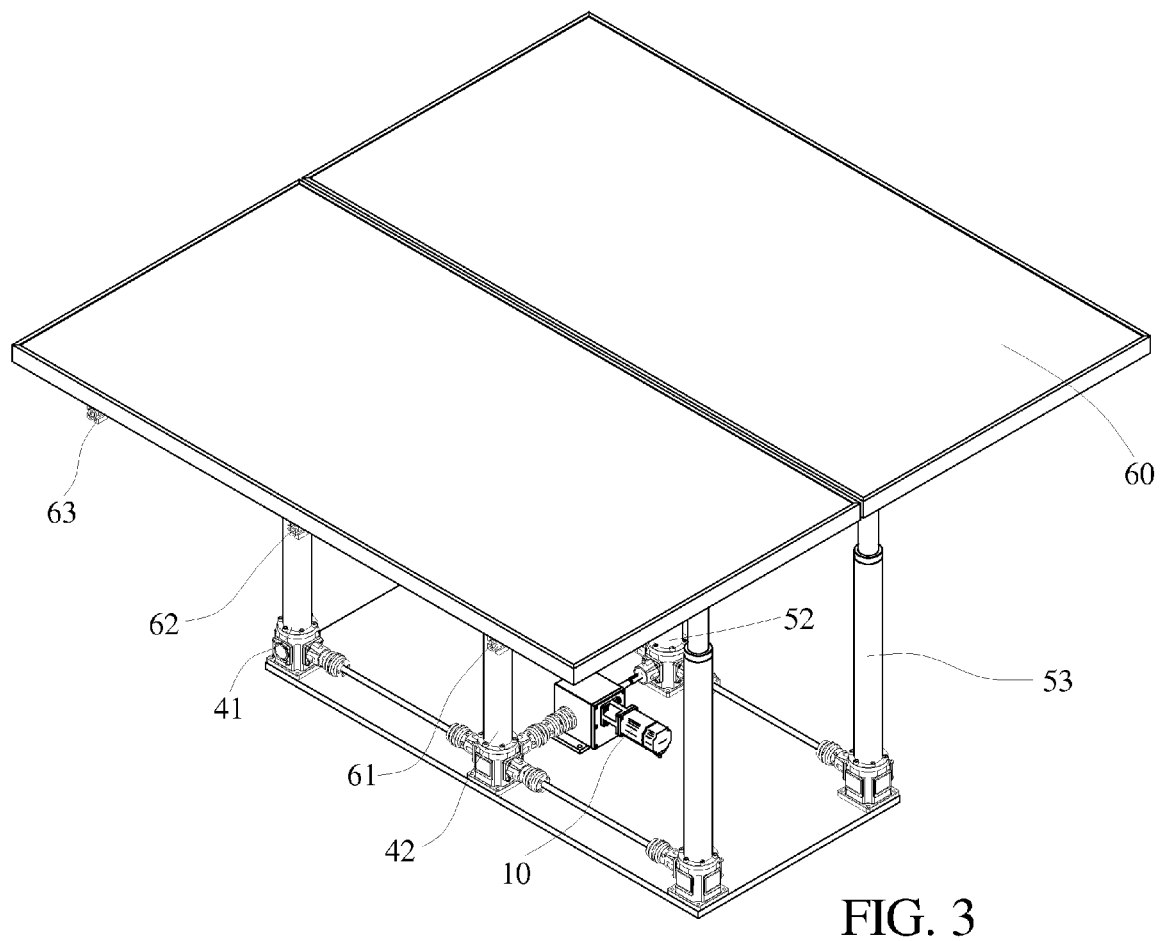
FIG. 3 shows the solar panel connected with the sun tracking system of the present invention.
Figure 4:
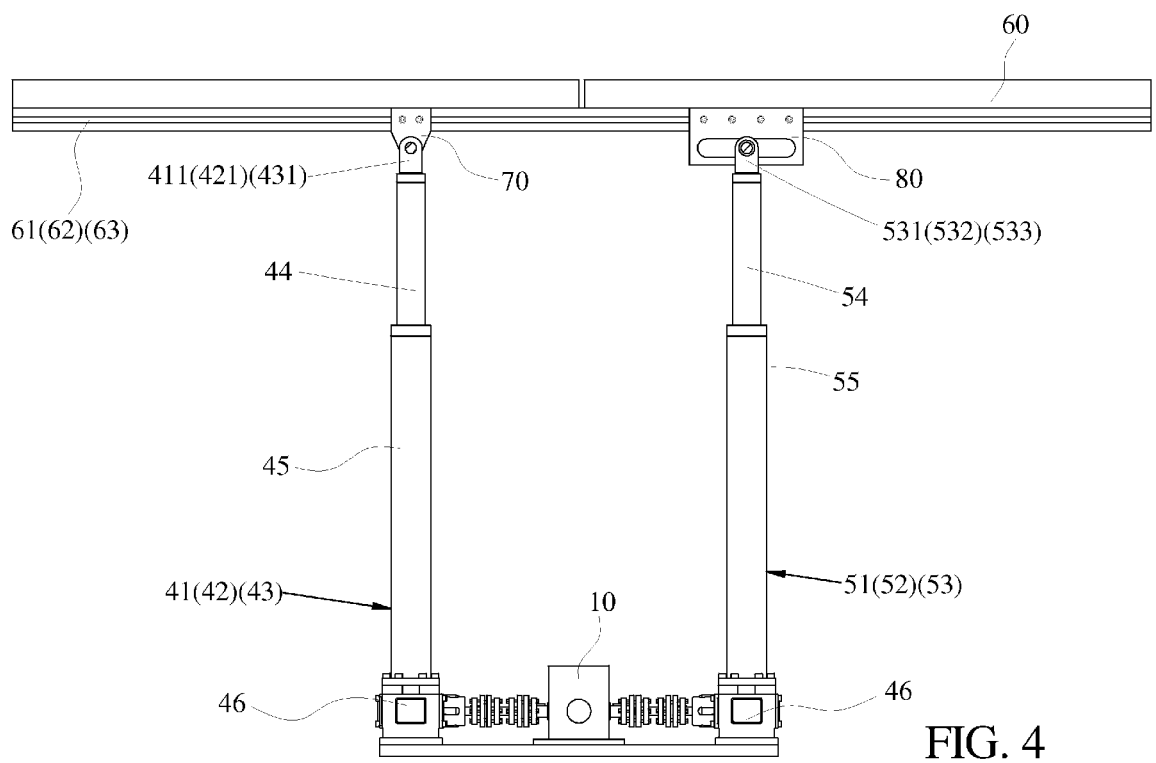
FIG. 4 shows the pivotal connection unit and the sliding unit of the sun tracking system of the present invention.
Figure 5:
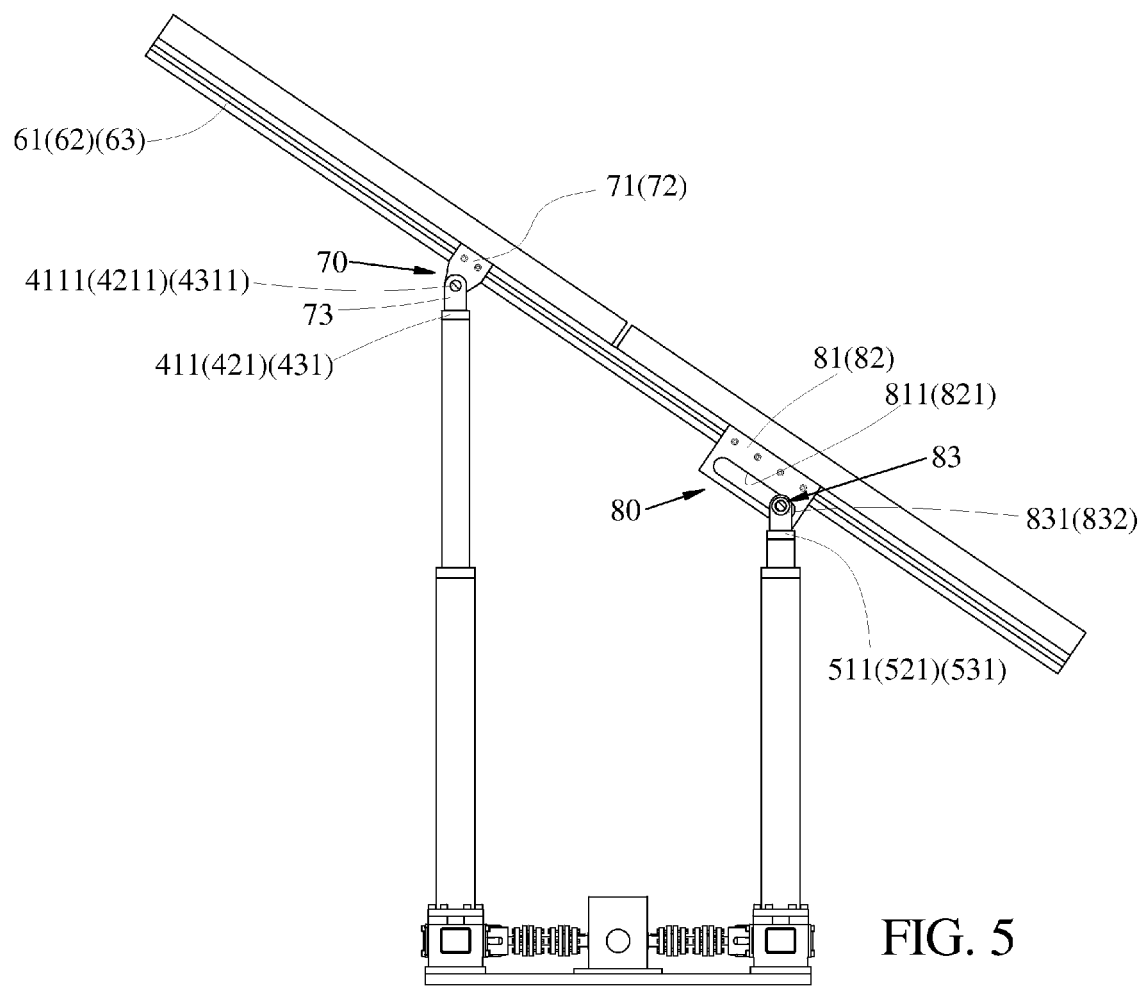
FIG. 5 shows that the solar panel is tilt by the operation of the pivotal connection unit and the sliding unit of the sun tracking system of the present invention.
Figure 6:
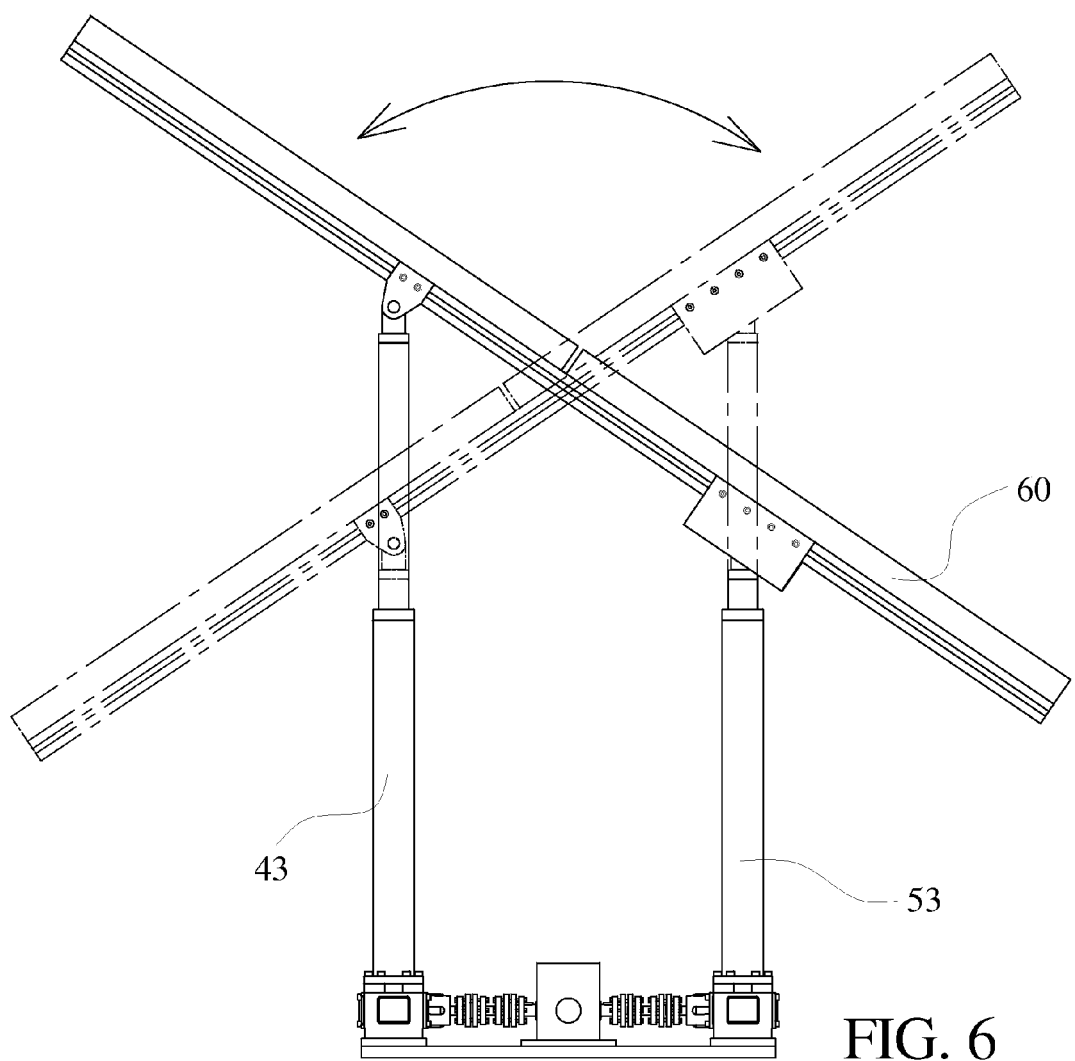
FIG. 6 shows that the solar panel is operated by the operation of the pivotal connection unit and the sliding unit of the sun tracking system of the present invention.
Figure 7:
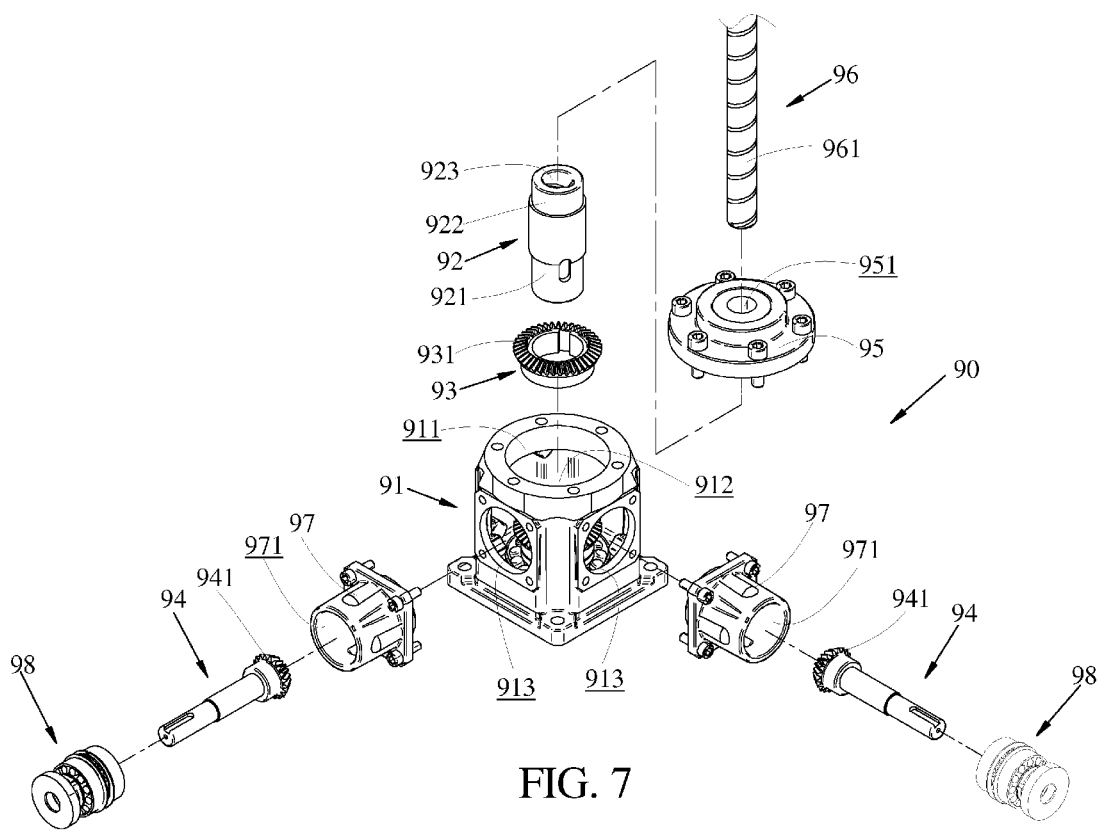
FIG. 7 shows an exploded view to show the elevation unit of the sun tracking system of the present invention.

Referring to FIGS. 1 to 6, the sun tracking system of the present invention comprises a reduction device of a servo motor 10 which proceeds clockwise or counter clockwise revolutions by command signals. Two rows of cylinders and each row includes three cylinders 41, 42, 43, 51, 52, 53. Multiple shafts 20 are connected between the reduction device of a servo motor 10 and the cylinders 42, 52 or between the cylinders 41, 42, 43 and the cylinders 51, 52, 53. Multiple couplers 30 are connected between the reduction device of a servo motor 10 and the shafts 20, or between the shafts 20 and the cylinders 41, 42, 43, 51, 52, 53;

A solar panel 60 has three rails 61, 62, 63 which are respectively located corresponding to the cylinders 41, 42, 43, 51, 52, 53 of the first and second rows of cylinders. Multiple pivotal connection units 70 are fixed to respective distal ends 411, 421, 431 of the cylinders 41, 42, 43 of the first row of cylinders and center portions of the three rails 61, 62, 63 of the solar panel 60.

Multiple sliding units 80 are respectively and fixedly connected to respective distal ends 511, 521,531 of the cylinders 51, 52, 53 of the second row of cylinders and the rails 61, 62, 63 of the solar panel 60. The cylinders 41, 42, 43 of the first row of cylinders are moved upward and downward synchronously when the reduction device of a servo motor 10 proceeds revolutions in a pre-set direction, and the cylinders 51, 52, 53 of the second row of cylinders are moved downward or upward synchronously so as to change inclination of the solar panel 60 to enable the solar panel 60 to aim the sun all the time.

The cylinders 41, 42, 43, 51, 52, 53 each include an inner tube 44 and 54 and an outer tube 45 and 55 so as to reinforce the structural strength of the cylinders 41, 42, 43, 51, 52, 53.

Each of the cylinders 41, 42, 43, 51, 52, 53 includes an elevation unit 90 at a base portion thereof and the elevation unit 90 includes a bevel gear unit 46 to change transmission directions.

Each elevation unit 90 includes a base 91 and an opening 911 is defined in a top thereof. A space 912 is defined in each of the base 91 and communicates with the opening 911. A side hole 913 is defined in one side of each of the bases 91. A threaded sleeve 92 includes a first end 921 and a second end 922. The first and second ends 921, 922 are respectively and pivotably located in the space 912. One of the first and second ends 921, 922 is pivotably connected to an underside of the base 91. The threaded sleeve 92 includes a threaded passage 923 defined therethrough. A bevel gear set 93 includes a first bevel gear 931 and mounted to the first end 921 of the threaded sleeve 92 so that the first bevel gear 931 is moved with movement of the first and second ends 921, 922 of the threaded sleeve 92. The first bevel gear 931 is engaged with a link 94. A cover 95 is fixedly connected to the top of the base 91 and includes a central hole 951. A support rod 96 includes an elongate threaded rod 961 which is threadedly engaged with the threaded passage 923 of the threaded sleeve 92. At least one connection part 97 is connected to the side hole 913 and includes a through hole 971 which is in communication with the side hole 913. The link 94 has a second bevel gear 941 located at one end thereof and pivotably connected to the through hole 971 of the connection part 97 so that the first and second bevel gears 931, 941 are engaged with each other. A support part 98 is located between the link 94 and the connection part 97;

Each of the pivotal connection parts 70 includes two first plates 71, 72 and a pivot end 73, wherein the two first plates 71, 72 are fixed to the rail 61 or 62 or 63. The distal ends 411, 421, 431 are located between the two first plates 71, 72. The pivot end 73 extends through a pivotal hole 4111, 4211, 4311 of the distal ends 411, 421, 431 and is fixed to the two first plates 71, 72.

The sliding unit 80 includes two second plates 81, 82 and a pulley set 83, wherein the two second plates 81, 82 are fixed to the rail 61, or 62, or 63 and each of the two second plates 81, 82 includes a slot 811,821. The distal ends 511, 521, 531 of the cylinders 51, 52, 53 are located between the two second plates 81, 82. The pulley set 83 is fixed to the distal ends 511, 521, 531 of the cylinders 51, 52, 53 and bearings 831, 832 of the pulley set 83 are engaged with the slots 811, 821, so that the bearings 831, 832 are restricted to move within the slots 811, 821.

While we have shown and described the embodiment in accordance with the present invention, it should be clear to those skilled in the art that further embodiments may be made without departing from the scope of the present invention.

What is claimed is:

1. A sun tracking system comprising:
    a reduction device of a servo motor which proceeds clockwise or counter clockwise revolutions by command signals;
    multiple shafts;
    multiple couplers;
    at least two rows of cylinders and each row having at least two cylinders, the shafts connected between the reduction device of a servo motor and the cylinders or between the cylinders and the cylinders, the couplers connected between the reduction device of a servo motor and the shafts, or between the shafts and the cylinders, each of the cylinders including an elevation unit at a base portion thereof and each elevation unit including a base and an opening defined in a top thereof, a space defined in each of the base and communicating with the opening, a side hole defined in at least one side of each of the bases, a threaded sleeve including a first end and a second end, the first and second ends respectively and pivotably located in the space, one of the first and second ends pivotably connected to an underside of the base, the threaded sleeve including a threaded passage defined therethrough, a bevel gear set including a first bevel gear and mounted to the first end of the threaded sleeve so that the first bevel gear is moved with movement of the first and second ends of the threaded sleeve, the first bevel gear engaged with a link, a cover fixedly connected to the top of the base and including a central hole, a support rod including an elongate threaded rod which is threadedly engaged with the threaded passage of the threaded sleeve, at least one connection part which is connected to the side hole and including a through hole which is in communication with the side hole, the link having a second bevel gear located at one end thereof and pivotably connected to the through hole of the connection part so that the first and second bevel gears are engaged with each other, a support part located between the link and the connection part;
    a solar panel having at least two rails which are respectively located corresponding to the cylinders of the first and second rows of cylinders;
    multiple pivotal connection units fixed to respective distal ends of the cylinders of the first row of cylinders and center portions of the at least two rails of the solar panel, and
    multiple sliding units respectively and fixedly connected to respective distal ends of the cylinders of the second row of cylinders and the at least two rails of the solar panel, the cylinders of the first row of cylinders moved upward or downward synchronously when the reduction device of a servo motor proceeds revolutions in a direction, and the cylinders of the second row of cylinders moved downward or upward synchronously so as to change inclination of the solar panel.

2. The system as claimed in claim 1, wherein the cylinders each include an inner tube and an outer tube.

3. The system as claimed in claim 1, wherein each of the pivotal connection parts includes two first plates and a pivot end, the two first plates are fixed to the at least two rails, the distal ends are located between the two first plates, the pivot end extends through a pivotal hole of the distal ends and is fixed to the two first plates.

4. The system as claimed in claim 1, wherein the sliding unit includes two second plates and a pulley set, the second plates are fixed to the rail and each of the two second plates includes a slot, the distal ends of the cylinders are located between the two second plates, the pulley set is fixed to the distal ends of the cylinders and bearings of the pulley are engaged with the slots, so that the bearings are restricted to move within the slots.

* * * * *